UNITED STATES PATENT OFFICE.

ANDREW A. DUNHAM, OF BAINBRIDGE, NEW YORK, ASSIGNOR TO CASEIN COMPANY OF AMERICA, A CORPORATION OF NEW JERSEY.

DESICCATED MILK PRODUCT AND PROCESS FOR PRODUCING SAME.

1,126,734.  Specification of Letters Patent.  Patented Feb. 2, 1915.

No Drawing.  Application filed April 16, 1914.  Serial No. 832,172.

*To all whom it may concern:*

Be it known that I, ANDREW A. DUNHAM, a citizen of the United States, residing at Bainbridge, in the county of Chenango and State of New York, have invented or discovered certain new and useful Improvements in Desiccated Milk Products and Processes for Producing Same, of which the following is a specification.

This invention has for its object the production of a food or medicinal composition consisting of sodium glycerophosphate, or other suitable glycerophosphate, admixed with or in combination with the solid constituents of whole or skim milk; that is to say, admixed with or in combination with casein, lactose, albumen, butter fats (where whole milk is used) and the salts which constitute the so-called solid constituents of milk, the composition to be used for food or medicinal purposes. In speaking of milk in the paragraphs following I refer either to whole milk, skim milk or to a combination of both.

Numerous processes and products have heretofore been known in which albuminous substances, like the proteids of corn, wheat, etc., have been treated in various ways with sodium glycerophosphate to produce a product in an easily assimilable form. So far, however, as is known to me no one has produced a dry food composition consisting of sodium glycerophosphate, or any other suitable glycerophosphate, admixed with or in combination with the solid constituents of milk.

In carrying out my invention I prefer first to evaporate the milk to a heavy condensed form, that is to about 15 degrees Baumé. This can be done in a vacuum pan or any other suitable receptacle for evaporation, and the resulting condensed milk is then treated with sodium glycerophosphate or any other suitable glycerophosphate. Now to about 95 parts of the condensed milk I add preferably about five parts of sodium glycerophosphate, figured on a dry weight basis of the milk. The sodium glycerophosphate is thoroughly incorporated with the milk and the mixture is then dried by any suitable means. The resulting product is quite palatable and is perfectly soluble in cold water. The sodium glycerophosphate does not coagulate the casein in the milk, even though the sodium glycerophosphate used reacts acid to litmus.

This novel product has a very distinct advantage over other compositions containing a glycerophosphate and albuminous substance, because the product is palatable, easily soluble and may be easily assimilated.

Instead of adding the sodium glycerophosphate to condensed milk a small percentage thereof may be thoroughly mixed with dried milk, or milk powder, if desired, to produce the novel food product. Instead of sodium glycerophosphate, any other suitable glycerophosphate may be employed, meaning by "suitable" a glycerophosphate which when thoroughly incorporated with milk and the mixture dried, or when admixed or combined with the solid constituents of milk, will produce a product that will be palatable, easily soluble and easily assimilated, and which possesses food and medicinal values.

While it is preferred to combine about five per cent. of the glycerophosphate with the dry constituents of the milk, in producing the novel food or medicinal product, it will be understood that this percentage of the glycerophosphate may be varied to suit different conditions.

Having thus described my invention or discovery I claim and desire to secure by Letters Patent:

1. The herein described process for producing glycerophosphate milk powder, consisting in thoroughly mixing a glycerophosphate with milk on a basis of about five parts of the glycerophosphate to about ninety-five parts of the solid constituents of the milk, and then drying the mixture to solid form.

2. The herein described process for producing sodium glycerophosphate milk powder, consisting in thoroughly mixing sodium glycerophosphate with milk on a basis of about five parts of the sodium glycerophosphate to about ninety-five parts of the solid constituents of the milk, and then drying the milk to solid form.

3. The herein described process for producing a glycerophosphate milk powder, consisting in first condensing the milk to about 15 degrees Baumé, then thoroughly incorporating a glycerophosphate with the condensed milk in a proportion of about five parts of the glycerophosphate to about ninety-five parts of the solid constituents of the milk, and then drying the mixture to solid form.

4. The herein described process for producing sodium glycerophosphate milk powder, consisting in first condensing the milk to about 15 degrees Baumé, then thoroughly incorporating sodium glycerophosphate with the condensed milk in a proportion of about five parts of the sodium glycerophosphate to about ninety-five parts of the solid constituents of the milk, and then drying the mixture to solid form.

5. A food or medicinal product consisting of desiccated milk containing a small percentage of a glycerophosphate.

6. A food or medicinal product consisting of desiccated milk containing a small percentage of sodium glycerophosphate.

In testimony whereof I affix my signature, in presence of two witnesses.

ANDREW A. DUNHAM.

Witnesses:
CARLTON CRUMB,
L. A. STEVENS.